Aug. 7, 1962 P. E. OLSON 3,048,158
LOW OIL PRESSURE PROTECTION APPARATUS
Filed Feb. 8, 1960 2 Sheets-Sheet 1

INVENTOR.
PAUL E. OLSON
BY
Adelbert A. Steinmiller
ATTORNEY

Aug. 7, 1962 P. E. OLSON 3,048,158
LOW OIL PRESSURE PROTECTION APPARATUS
Filed Feb. 8, 1960 2 Sheets-Sheet 2
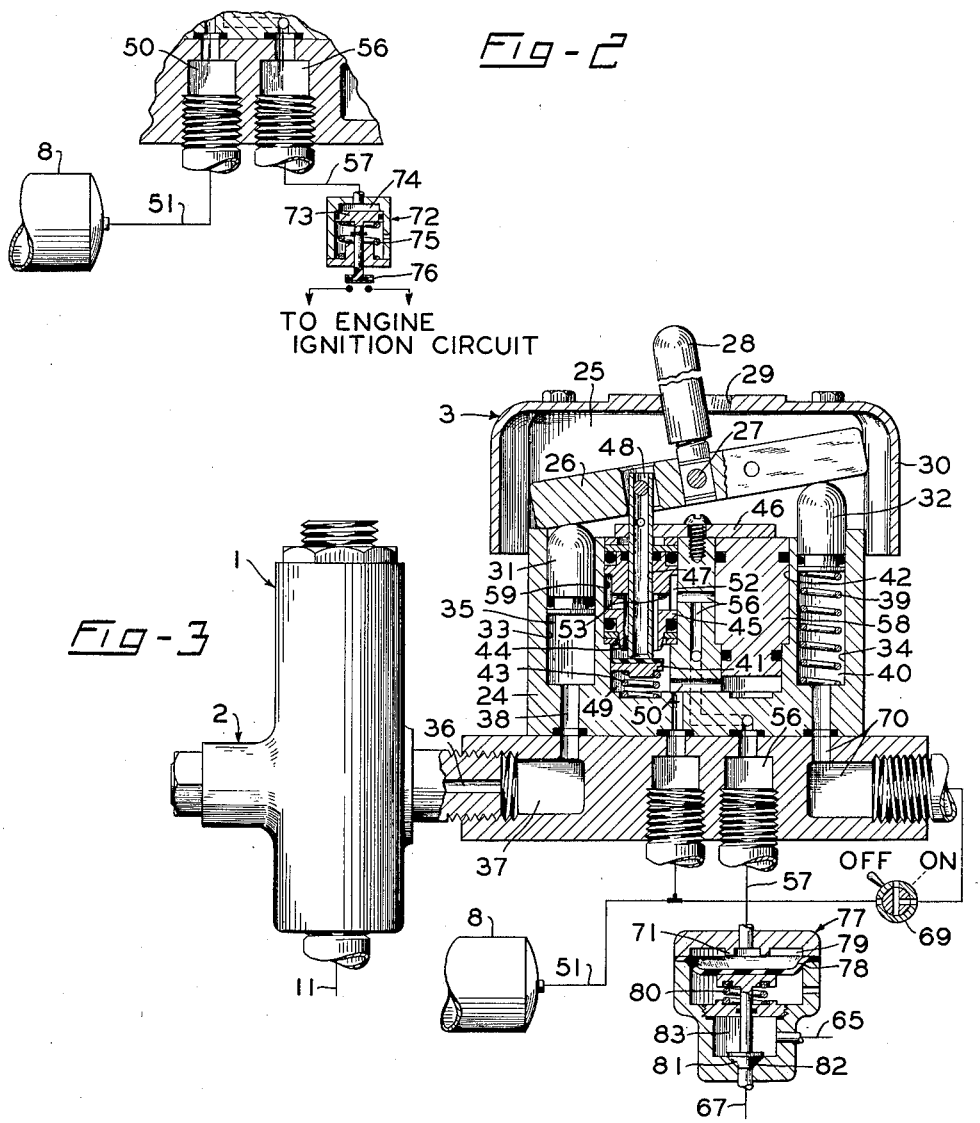
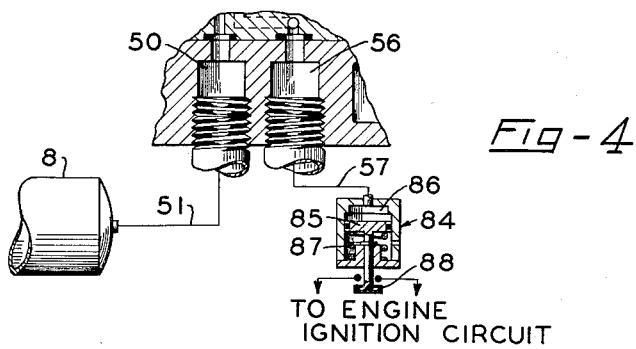
INVENTOR.
PAUL E. OLSON
BY
Adelbert A. Steinmiller
ATTORNEY United States Patent Office 3,048,158
Patented Aug. 7, 1962

3,048,158
LOW OIL PRESSURE PROTECTION APPARATUS
Paul E. Olson, Pittsburgh, Pa., assignor to Westinghouse Air Brake Company, Wilmerding, Pa., a corporation of Pennsylvania
Filed Feb. 8, 1960, Ser. No. 7,399
8 Claims. (Cl. 123—196)

This invention relates to low oil pressure protection apparatus for machines such as compressors, motors, and the like equipped with an oil lubrication system and more particularly to such apparatus especially adapted for use with plunger-type pump pressure systems in which the oil pressure fluctuates.

Various control devices have heretofore been provided to detect low oil pressure in the lubrication system of an engine and to correspondingly control shutdown of the engine. Such control devices, however, are designed primarily for use with gear-type pump pressure arrangements providing a substantially constant oil pressure in the lubrication system and are not suitable for use with lubrication systems in which the oil pressure fluctuates due to use of plunger or displacement type pumps.

The primary object of this invention is to provide improved apparatus for controlling shutdown of an engine responsively to a below-normal oil pressure condition in the engine lubrication system of the displacement type wherein the oil pressure is subject to fluctuations.

According to this object, one embodiment of the invention comprises a pressure-responsive control valve device subject to the oil pressure in an oil pressure lubrication system of an air compressor, a pressure-actuated fuel control valve controlled by the valve device for causing the fuel control valve to shut off the fuel supply to a driving engine for the compressor when the oil pressure in the lubrication system reduces to a chosen low value below normal pressure, and a timing device consisting of an accumulator, connected to the valve device, a check valve past which oil under pressure is supplied to the accumulator and a by-pass choke for reverse flow of oil under pressure from the accumulator on a selected time basis. The accumulator maintains oil pressure on the valve device, sufficient to maintain the fuel control valve open during the intervals in which the oil pump does not apply pressure to the system, incidental to normal operation of the pump.

If the pump fails to apply pressure to the system for a time longer than the selected time established by the timing device, the back flow of oil through the by-pass choke reduces the oil pressure acting on the valve device to below the chosen low value, thus resulting in operation of the fuel valve to its shut-off position to cause stoppage of the engine.

Several other generally similar embodiments are disclosed, in several of which the valve device controls a pressure actuated switch for interrupting the ignition circuit of the driving engine if the oil pressure in the lubrication system reduces to a chosen low pressure.

In the accompanying drawings, FIG. 1 is a sectional view of the apparatus embodying the invention, shown associated with an engine-compressor unit, including a fuel shut-off valve device normally supplied with pneumatic pressure and effective upon release of pneumatic pressure therefrom to shut down the engine responsively to an abnormally low oil pressure condition in the oil lubrication system for the compressor;

FIG. 2 is a fragmentary sectional view, showing a modified arrangement including a pneumatic pressure actuated switch for interrupting the ignition circuit of the engine and thus stopping the engine responsively to an abnormally low oil pressure condition in the oil lubrication system of the compressor;

FIG. 3 is a view, partly in section and partly in outline, showing apparatus differing from that shown in FIG. 1, in that certain parts are rearranged in a manner that a fuel shut-off device is actuated to shut off fuel supply to the engine responsively to supply of pneumatic pressure thereto;

FIG. 4 is a fragmentary view of a modification of the apparatus shown in FIG. 3 with a pneumatic pressure actuated switch device in the ignition circuit for the engine.

Description

Figure 1:
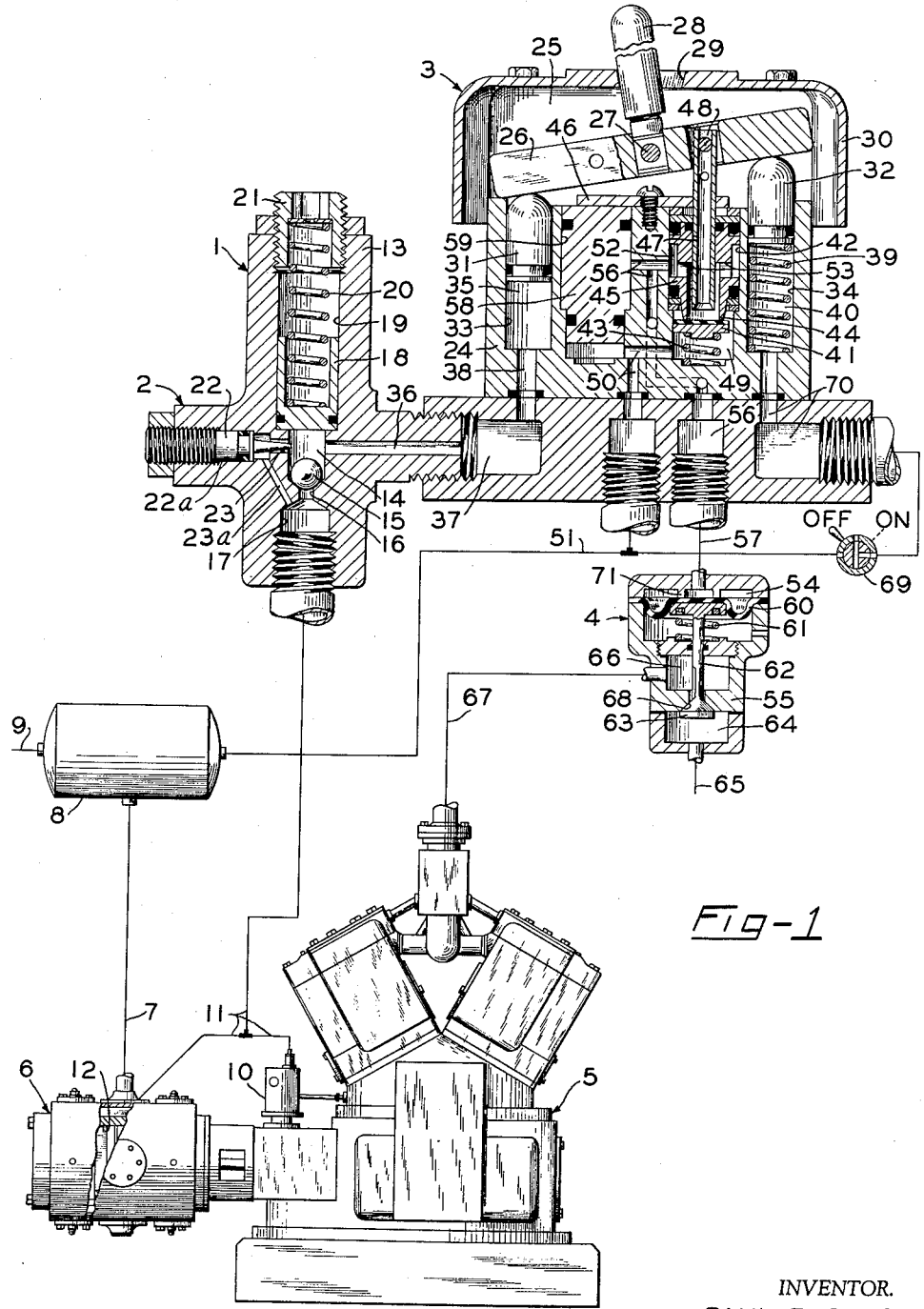

The embodiment of the invention, shown in FIG. 1 of the drawings, comprises an accumulator 1, timing means 2, a control valve device 3 and a shut-off device 4.

For purposes of illustration, the apparatus is shown associated with an engine-compressor unit of the type including an engine 5 driving a compressor 6 for supplying compressed air via a pipe 7 to a reservoir 8 provided with a pipe 9 to which any pneumatically driven power device (not shown) may be connected. The engine and the compressor each have separate and different oil lubrication systems and, for simplicity, the lubrication system for the engine, which is usually of the constant-pressure-gear pump type, is not shown. The oil lubrication system for the compressor 6 includes an oil pump 10 of the plunger type driven from the engine camshaft, and an oil line or pipe 11 leading, in customary manner, from the pump 10 to the cylinder bore 12 of the compressor.

The accumulator 1 comprises a casing 13 having a chamber 14 therein in which there is disposed a ball check valve 15 seatable on a valve seat formed at one end of a bore 16 open at its opposite end to oil pressure in pipe 11 via a branch of pipe 11 and a port 17. A piston 18, sealingly reciprocable within a bore 19, is subject at its one side to oil pressure in chamber 14 and opposingly at its opposite side to the force of a spring 20, one end of which is backed by a perforated screw plug 21 in the outer end of bore 19. The perforations in plug 21 maintain the chamber on this side of the piston vented to atmosphere at all times.

The timing means 2 comprises a needle valve 22 sealingly screw-threaded into a bore 22a and adjustable to control reverse flow of oil through an orifice 23 from chamber 14 to bore 22a and thence via a passage 23a to port 17, in bypass of check valve 15, at a selected restricted rate in accordance with the timing desired.

Control valve device 3, hereinafter described in detail, is disclosed and claimed in copending application Serial No. 72,600, filed November 30, 1960, by Charles Doolittle and Arthur J. Bent, and assigned to the same assignee.

Control valve device 3 comprises a casing 24 having a transverse slot 25 in which a lever 26 is fulcrumed, intermediate its ends, on a pin 27 for rockable movement. Lever 26 has suitably attached thereto a handle 28 for manual rocking of the lever, said handle extending upwardly through an opening 29 or slot in a casing cover 30, suitably secured to casing 24, as by screws.

A pair of pistons 31 and 32 are sealingly reciprocable in respective spaced parallel bores 33 and 34 in the casing 24 in such a manner as to contact corresponding opposite ends of lever 26. Piston 31 is subject to oil pressure supplied to a chamber 35, formed in bore 33, from chamber 14 of accumulator 1 via a passage 36 in casing 13 of the accumulator, a port 37 of casing 24 and a passage 38. Port 37 is threaded at its outer end to receive a threaded boss of casing 13 to effect joinder of the casings 13 and 24. Piston 32 is subject to the force of a spring 39 coaxially disposed in a chamber 40 formed in bore 34. Spring 39 exerts a force corresponding to a selected low oil pressure substantially lower than the normal oil pressure required in the lubrication system of the compressor 1 to maintain proper lubrication of the components therein.

Pistons 31 and 32 act opposingly to rock lever 26 in either a clockwise or a counterclockwise direction according to whether the force of the oil pressure in chamber 35 acting on piston 31 is greater or less than the force of spring 39 acting against piston 32, respectively.

The foregoing structure including the pistons 31 and 32 and the lever 26 are hereinafter sometimes referred to as the actuator means.

A valve 41 of the disc or poppet type is disposed in the inner end of a bore 42 in casing 24 and is biased by the force of a coaxial spring 43, interposed between valve 41 and an end wall of bore 42, toward and against an annular valve seat 44 formed on a valve seat member 45 in the form of a piston sealingly disposed in the outer end of bore 42. A plate 46 suitably secured to the casing wall, as by a screw, serves to retain the member 45 in the bore 42. Member 45 has a central bore 47 therethrough of different diameters along the length thereof, the mouth of the bore 47 opening inside the valve seat 45 and the opposite end opening into slot 25.

A hollow tubular exhaust valve stem 48 is pivotally connected at its upper end by a pin to the lever 26, at a point intermediate pin 27 and piston 32, and at its lower or free end extends slidably through an aligned aperture in plate 46 into bore 47 of seat member 45 in sealed contact therewith. Stem 48 is shifted downwardly by clockwise rocking movement of lever 26 to cause the free end of stem 48 to engage and to unseat valve 41 from seat 44 against the force of spring 43 and the pressure of fluid acting on valve 41 in a chamber 49 open to reservoir 8 via a passage 50 and a pipe 51. Communication is established past valve 41, while thus unseated, via which fluid under pressure flows from chamber 49 to an annular recess or chamber 52, formed in the outer surface of valve seat member 45 via bore 47 and a plurality of transverse ports 53 in seat member 45, and thence to a chamber 54 within a casing 55 of shut-off device 4 via a passage 56 and a pipe 57. Counterclockwise rocking movement of lever 26 moves stem 48 upwardly to a position, in which it is shown, wherein the free end of stem 48 is raised out of contact with valve 41 and wherein valve 41 is biased into engagement with seat 44 by spring 43. In the latter position of stem 48, flow of fluid under pressure from chamber 49 of device 3 to chamber 54 of device 4 is cut off and chamber 54 of device 4 is vented to atmosphere via the bore in stem 48.

A cylindrical plug 58 is sealingly disposed in a bore 59 corresponding in dimensions to bore 42 and open to the same passages 50 and 56. Bore 59 is provided to permit interchange with plug 58 of valve seat member 45, valve 41 and spring 43 when it is desired to use a modified form of shut-off device as will be explained later. Plate 46 also serves to hold plug 58 within bore 59.

The shut-off device 4 comprises a diaphragm 60, suitably clamped between sections of casing 55 and subject at its one side to the pressure of fluid in chamber 54 and opposingly to the force of a coaxial spring 61 disposed in an atmospheric chamber at its other side. A follower associated with diaphragm 60 has a valve stem 62 extending therefrom and stem 62 has a poppet valve 63 formed at its end. Valve 63 controls the supply of fuel from a chamber 64, open via a port in casing 55 to an engine fuel supply line 65 connected to a fuel tank (not shown), to a chamber 66 which is always open to an engine fuel inlet port via a pipe 67. When chamber 54 of device 4 is vented, valve 63 is biased by spring 61 into engagement with a valve seat 68 formed at one end of a port through a partition wall between chambers 64 and 66 to cut off the flow of fuel from chamber 64 to chamber 66 and thereby to the engine.

Remote engine cut-out control is provided by an off-on valve 69, interposed in a branch of pipe 51, for connecting chamber 40 of device 3, via a passage 70 in casing 24 of device 3, to the reservoir 8 when a handle of valve 69 is moved to the "on" position to control the shutdown of the engine-compressor from a remote location.

*Operation*

In operation, let it be assumed initially that the apparatus of FIG. 1 is conditioned with the handle of the off-on valve 69 in "off" position, in which it is shown, for venting chamber 40, that the needle valve 22 is adjusted to permit a desired rate of return of oil under pressure from chamber 14 to port 17, and that the engine-compressor unit is shut down. In this case all of the components of the apparatus will be in their respective positions shown in the drawing. Chamber 35 will be devoid of oil under pressure and lever 26 will be biased to its counterclockwise limit position or engine cut-off position in which handle 28 is adjacent the left-hand end of slot 29 in cover 30 and in which the left-hand end of lever 26 contacts the casing 24 at the bottom of slot 25, as viewed in the drawing, and stem 48 will be in its upward limit position defined by the lip on the free end of stem 48 being in spaced relation with valve 41 to permit venting of chamber 54 of device 4 via stem 48.

To start the engine, it is first necessary to move handle 28 of lever 26 to its clockwise limit position or engine running position adjacent the right end of slot 29 of cover 30, in consequence of which lever 26 is correspondingly rocked clockwise to its limit position in which the right-hand end of lever 26 contacts casing 24 at the bottom of slot 25, as viewed in the drawing, against the force of spring 39 of device 3. Valve stem 48 is thus moved downwardly successively from its uppermost position into engagement with valve 41 and then further downwardly to unseat valve 41 from seat 44 against the force of spring 43 and the pressure of fluid acting on valve 41 in chamber 49. With valve 41 thus unseated, fluid under pressure flows from chamber 49 in device 3 to chamber 54 in shut-off device 4 via bore 47 in member 45, passage 56 and pipe 57. The pressure of fluid in chamber 54 of device 4 acts against diaphragm 60 to unseat valve 63. With valve 63 unseated from seat 68 communication is established through which fuel may flow from chamber 64 to chamber 66 and thence to pipe 67 and to the engine. While holding the handle 28 in its clockwise limit position, the engine 5 can thus be started by the usual engine starting procedure.

As soon as the engine 5 starts, pump 10 forces oil under pressure into the lubrication system and into port 17 of device 1, via pipe 11, thence past check valve 15 into chamber 14 of the accumulator. Oil pressure in chamber 14 acts against piston 18 to compress spring 20 an amount corresponding to the oil pressure established in chamber 14. Oil under pressure from chamber 14 flows to chamber 35 of device 3 via passage 36, port 37 and passage 38 of device 3 and acts against piston 31 causing it to move upwardly. The handle 28 can be released as soon as the force of oil pressure in chamber 35 acting on piston 31 increases to a value higher than the cumulative forces of spring 39 acting on piston 32, of spring 43 acting on valve 41, and the force corresponding to the pressure of fluid in chamber 49 acting on valve 41, so as to keep the lever 26 rocked in its clockwise limit position without the aid of manual force of the handle. It will thus be apparent that the engine will continue to run as long as a normal oil pressure is maintained in the lubrication system and the lever 26 is kept rocked in its clockwise limit position.

It will be understood that the force of spring 20 on piston 18 of the accumulator 1 continues to exert normal pressure on the oil in chamber 14 and thus the oil pressure in chamber 35 continues to exert sufficient force to hold lever 26 in its clockwise limit position notwithstanding momentary pressure rarefactions in the lubrication system during the intake stroke of the displacement type pump 10. The needle valve 22 is so adjusted that the restricted backflow of oil under pressure via orifice 23 from chamber 14 to pipe 11, while the pressure rarefaction occurs, is not of sufficient volume to effect a reduction of the mean oil pressure acting on piston 35 to permit reverse tilting of the lever 26 in a counterclockwise direction.

As a matter of fact, the orifice 23 so restricts backflow of oil under pressure that a selected number of seconds, such as thirty, must elapse before the oil pressure in chamber 14 and thus in chamber 35 reduces sufficiently to allow reverse tilting of lever 26. Thus as long as the pump 10 continues to operate properly, the momentary pressure rarefaction in the lubrication system incidental to the intake stroke of the pump piston does not affect the position of the lever 26.

However, if for some reason the pump 10 ceases to operate to maintain normal oil pressure in the lubrication system, the oil pressure in chamber 14 and thus in chamber 35 will be reduced after a given interval of time, such as thirty seconds, due to backflow of oil through the orifice 23 to the pipe 11. In such case, when the oil pressure in chamber 35 decreases to a value below that corresponding to the force of spring 39, lever 26 will be rocked to its counterclockwise limit position, as previously defined, carrying stem 48 out of engagement with valve 41 and allowing valve 41 to seat on valve seat 44. Chamber 54 of device 4 will thus be vented via pipe 57, passage 56, bore 47 and stem 48. When chamber 54 is vented, spring 61 of device 4 will bias the diaphragm 60 to its upper limit position defined by a stop 71 in the casing 55 wall. Valve 63 of device 4 will be correspondingly carried upward into seating engagement with valve seat 68 and will be effective to cut off the flow of fuel to the engine and consequently cause the engine-compressor to shut down.

If desired, the engine may be cut out from a remote location by moving the handle of the off-on valve 69 to its "on" position, as previously described. In this event, fluid under pressure will flow from the reservoir 8 past valve 69 to chamber 40 of device 3, and will act on the inner face of piston 32 to cause the piston, in conjunction with the force applied by spring 39 in bore 34, to exert a force on lever 26 which, assuming the engine is running, is positioned in its engine running or clockwise limit position. The unit fluid pressure supplied to chamber 40 is of a value higher than the value of the normal oil pressure in the lubrication system and consequently a counterclockwise moment is exerted on lever 26 which then transmits a back pressure to the oil in chambers 35 and 14 via piston 31. Check valve 15 thus seats and oil under pressure trapped in chamber 14 escapes therefrom at a restricted rate past the needle valve 22. The combined force of the pressure of fluid under pressure in chamber 40 and of spring 39 exerted on lever 26 will act to push piston 31 down into bore 33 displacing oil from chamber 35 into chamber 14 of the accumulator 1 to shift piston 18 in the accumulator upward against the force of spring 20. While the lever 26 is rocked counterclockwise to its limit position, the stem 48 will be shifted upward, valve 41 will be seated and chamber 54 of shut-off device 4 will be vented via stem 48 in the manner described, cutting out operation of the engine. It will be noted that the value of spring 20 is such that when chamber 14 is charged with oil at a normal pressure, spring 20 will not be fully compressed by piston 18.

FIGS. 2, 3 and 4 show modified embodiments of the apparatus. The same numerals used in FIG. 1 to identify the various components of the apparatus will hereafter be used to identify like components.

In FIG. 2, a modified shut-off device 72, shown as a pneumatic control switch, is provided in the ignition circuit of the engine for controlling shutdown of the engine 5 upon abnormally low oil pressure in the lubrication system of the compressor 6. Device 72 comprises a piston 73 sealingly reciprocable within a bore in a casing and subject at one side to pressure of fluid in a chamber 74 open to pipe 57 and at its opposite side opposingly to the force of a spring 75 disposed in an atmospheric chamber. A stem on piston 73 has an insulated contact member 76 for engaging a pair of stationary contact members to close the ignition circuit of the engine.

In the operation of the apparatus of FIG. 2, when oil pressure in the lubrication system of the engine is normal and correspondingly lever 26 is rocked to its clockwise limit position, pipe 57 will be charged as previously explained, and pressure of fluid from pipe 57 will flow to the pneumatic switch 72 to move piston 73 downwardly against the force of spring 75 thus causing contact member 76 to close the engine ignition circuit to permit operation of the engine. When the oil pressure in the lubrication system reduces abnormally, pipe 57 will be vented as previously described and spring 75 will bias piston 73 upwardly to thereby carry contact member 76 upwardly thereby to open the ignition circuit of the engine for effecting shutdown of the engine.

In FIG. 3, another modified shut-off device 77 is shown connected to valve device 3. Device 77 comprises a casing having therein a movable abutment, such as a diaphragm 78, subject at one side thereof to pressure of fluid in a chamber 79 open to pipe 57 and opposingly to the force of a spring 80 in an atmospheric chamber at its opposite side. A stem, having a valve 81 at one end, is operatively connected to the diaphragm 78 at its opposite end, said valve 81 being unseatable from a valve seat 82 to control supply of fuel from a chamber 83, open to a fuel tank (not shown) via pipe 65, to the engine via pipe 67.

Device 77 is operable in a reverse manner from device 4 shown in FIG. 1 in that when chamber 79, which corresponds to chamber 54 of device 4, is pressurized, valve 81 cuts off the flow of fuel to the engine whereas, as already explained, when chamber 54 of device 4 was charged with fluid under pressure, fuel was supplied to the engine.

In order to adjust valve device 3 to charge chamber 79 of device 77 with fluid under pressure instead of venting it so as to effect shutdown of the engine 5 when the oil pressure in the lubrication system of the compressor 6 decreases to an abnormal pressure, it is only necessary to interchange valve member 45, valve 41 and spring 43 with plug 58 and to pivotally connect stem 48 to lever 26 intermediate piston 31 and pin 27, as shown in FIG. 3.

With these components rearranged the operation of device 3 is the same as that described for FIG. 1 with this exception, that when lever 26 is rocked to its counterclockwise limit position as when the oil pressure in the lubrication system is abnormally low, stem 48 will be in its downward limit position thereby unseating valve 41. Chamber 79 of device 77 will thus be charged and the pressure of fluid therein will cause diaphragm 78 and valve 71 of device 77 to move downwardly for seating valve 81 on seat 82 thus cutting off flow of fuel to the engine; and when lever 26 is rocked to its clockwise limit position, as when the oil pressure in the lubrication system is normal, then lever 26 will carry stem 48 upward out of engagement with valve 41, whereby valve 41 will cut off the flow of fluid to chamber 79 and the latter chamber will be vented via stem 48 to cause valve 81 to be unseated for opening the fuel supply line to the engine.

FIG. 4 shows a modified shut-off device 84, such as a pneumatic control switch, substituted for device 77 of FIG. 3. Device 84 comprises a piston 85 sealingly reciprocable within a bore in a casing and subject at one side to pressure of fluid in a chamber 86 open to pipe 57 and at its opposite side opposingly to the force of a spring 87 disposed in an atmospheric chamber. A stem on piston 85 has an insulated contact member 88 for engaging a pair of stationary contact members when the piston is biased to an upper position by spring 87. With this arrangement of the apparatus, in operation, chamber 86 of device 84 will be charged when the pressure in the lubrication system of the engine is abnormally low and lever 26 is correspondingly rocked to its counterclockwise position as previously explained, and the pressure of fluid acting on piston 85 will move the piston and contact member 88, operatively connected thereto, downwardly to disengage the contact member 88 from the stationary contact members in the ignition circuit for opening the circuit and thereby shutting down the engine; when chamber 86 is vented in the manner described for FIG. 3, then spring 87 of device 84 will bias piston 85 and contact member 88 upwardly to cause member 88 to engage the stationary contact members for closing the engine ignition circuit to permit operation of the engine.

It will be noted that, if the timing feature is not desired, the apparatus may be operated without the accumulator and the timing means, as by connecting pipe 11 directly to port 37 of device 3, provided a constant pressure type of pump is employed for the lubrication system. In this case, oil under pressure from pipe 11 will be effective in chamber 35 of device 3, when the engine is operating, to rock lever 26 clockwise to its fuel line opening position or ignition circuit closing position. Upon a reduction of oil pressure in the oil lubrication system from the higher normal pressure to below a value corresponding substantially to the value of spring 39, lever 26 will be rocked counterclockwise by spring 39 to shut off the engine.

Having now described the invention, what I claim as new and desire to secure by Letters Patent is:

1. Low oil pressure protection apparatus for an oil lubrication system of an engine-driven machine when the oil pressure in the system decreases from a normal pressure to below a chosen low value, said apparatus comprising a source of fluid under pressure, a fluid pressure controlled shut-off means for effecting stopping of the engine, valve means for controlling the supply of fluid under pressure from said source to and release of fluid under pressure from said shut-off means, actuating means for said valve means including means operatively connected to and communicating with said lubrication system so as to be responsive to a force corresponding to said oil pressure in said lubrication system and means for applying opposingly to said oil pressure force a biasing force corresponding to the said predetermined chosen low value of oil pressure, said oil pressure responsive means and said predetermined biasing force means being operative to actuate said valve means for controlling the supply of fluid under pressure to and release of fluid under pressure from said shut-off means so as to effect stopping of said engine when said oil pressure in said lubrication system decreases from said normal pressure to below said chosen low value, and timing means between said lubrication system and said actuating means for delaying for a selected interval of time the actuation of said valve means when said oil pressure in said system decreases below said chosen low value of oil pressure.

2. Low oil pressure protection apparatus, as claimed in claim 1, in which said timing means comprises means for preventing reduction of the oil pressure acting on said actuator means except at a selected restricted rate, thereby to delay operation of the said control valve means to effect operation of the shut-off means to stop the engine for a selected interval of time after reduction of oil pressure in the lubrication system is initiated.

3. Low oil pressure protection apparatus, as claimed in claim 1, in which said timing means comprises a check valve past which oil under presusre is supplied to said actuator means, a pressure accumulator for maintaining oil pressure on said actuator means during rarefactions of pressure in the lubrication system, and a restricted orifice via which oil under pressure flows back to the lubrication system at a rate such that the oil pressure on said actuator reduces from said normal pressure to below said chosen low value only after the expiration of a certain selected length of time.

4. Low oil pressure protection apparatus, as claimed in claim 1, further including casing means by which said control valve means and said actuator means are supported, and characterized in that said control valve means is selectably locatable in either one of a pair of spaced bores in said casing means according to whether pressure of fluid is to be supplied to or exhausted from said shut-off means by said control valve means to effect shutdown of the engine.

5. Low oil pressure protection apparatus as claimed in claim 1, further including and characterized by casing means on which said control valve means and said actuator means are supported and in which there are a pair of spaced bores of identical diameter, and a sealing plug disposed in one of said bores, said valve means being disposed in the other of said bores and operatively connected to said actuator means, said bores being of identical diameter so that said valve means and sealing plug are interchangeable therein according to whether pressure of fluid is to be supplied to or exhausted from said shut-off means by said control valve means to effect shutdown of the engine.

6. A low oil pressure protection apparatus for use with an oil lubrication system of an engine-driven machine, said apparatus comprising a source of fluid under pressure, fluid pressure actuated shut-off means operative in a normal position permitting operation of the engine upon supply of fluid under pressure thereto and operative at a shut-off position to effect stopping of the engine upon venting of fluid under pressure therefrom, a valve means having a supply position for supplying fluid under pressure to said shut-off means and an exhaust position for venting fluid under pressure from said shut-off means, actuator means for said valve means including means operatively connected to and communicating with said lubrication system so as to be responsive to a force corresponding to the oil pressure therein and means for applying opposingly to said oil pressure force a biasing force corresponding to a chosen low value below a certain normal oil pressure, said oil pressure responsive means and said biasing force means being operative to move said actuating means for actuating said valve means to said supply position when the oil pressure in the lubrication system increases above said chosen low value of oil pressure and for actuating said valve means to said exhaust position when the oil pressure in said lubrication system decreases from said normal position below said chosen low value of oil pressure, and timing means between said lubrication system and said actuating means for delaying for a selected interval of time the actuating of said valve means when said oil pressure in said system decreases below said chosen low value of oil pressure.

7. A low oil pressure protection apparatus for use with an oil lubrication system of an engine-driven machine, said apparatus comprising a source of fluid under pressure, fluid pressure actuated shut-off means operative in a normal position permitting operation of the engine upon venting of fluid under pressure therefrom and operative to a shut-off position to effect stopping of the engine upon supply of fluid pressure thereto, a valve means having a supply position for supplying fluid under pressure to said shut-off means and an exhaust position for venting fluid under pressure from said shut-off means, actuating means for actuating said valve means to one of said positions including means operatively connected to and communicating with said lubrication system so as to be responsive to a force corresponding to the oil pressure therein and means for applying a biasing force corresponding to a chosen low value below a certain normal oil pressure arranged opposingly to said oil pressure responsive means, said oil pressure responsive means and said biasing force means being operative to actuate said valve means to its supply position when the oil pressure in the lubrication system decreases below said chosen low value of oil pressure and to actuate said valve means to its exhaust position when the oil pressure in the lubrication system increases above said chosen low value of oil pressure, and timing means between said lubrication system and said actuating means for delaying for a selected interval of time the actuation of said valve means when said oil pressure decreases below said chosen low value of oil pressure.

8. Low oil pressure protection apparatus for an oil lubrication system of an engine driven machine, said apparatus comprising a source of pneumatic pressure, a pneumatic pressure controlled shut-off means for effecting stopping of the engine upon decrease of oil pressure from a normal pressure to below a chosen low value, a control valve device comprising a casing, valve means in said casing for controlling the supply of pneumatic pressure to and release of pneumatic pressure from said shut-off means, actuating means for said valve means, said actuating means comprising a valve actuating lever, a fulcrum pivotally mounting said lever intermediate its ends on said casing, and a pair of pistons each reciprocable in respective spaced bores in said casing means and contacting said lever at points on opposite sides of said fulcrum, one of said pistons being subject to the pressure of oil in the lubrication system and the other of said pistons being subject to a predetermined bias force thereby subjecting said lever to opposing moment forces for rocking said lever on said fulcrum to different positions thereby to actuate said valve means for supplying pneumatic pressure to and for releasing pneumatic pressure from said shut-off means so as to effect stopping of the engine when the oil pressure in said system falls below said chosen low value of oil pressure.

References Cited in the file of this patent
UNITED STATES PATENTS

| | | |
|---|---|---|
| 899,263 | Richards | Sept. 22, 1908 |
| 1,896,459 | Mullin | Feb. 7, 1933 |
| 2,112,664 | Dube | Mar. 29, 1938 |
| 2,497,695 | Sheppard | Feb. 14, 1950 |
| 2,768,708 | Cooper | Oct. 30, 1956 |